United States Patent
Zeng et al.

(10) Patent No.: US 11,100,268 B1
(45) Date of Patent: Aug. 24, 2021

(54) FAST AND ACCURATE SIMULATION FOR POWER DELIVERY NETWORKS WITH INTEGRATED VOLTAGE REGULATORS

(71) Applicant: Cadence Design Systems, Inc., San Jose, CA (US)

(72) Inventors: Zhiyu Zeng, Austin, TX (US); Hailin Jiang, Santa Clara, CA (US); Yanfei Gu, Austin, TX (US); Nityanand Rai, Uttar Pradesh (IN); Xin Gu, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 465 days.

(21) Appl. No.: 15/690,026

(22) Filed: Aug. 29, 2017

(51) Int. Cl.
G06F 30/367 (2020.01)
G06F 30/20 (2020.01)
G06F 30/18 (2020.01)
G06F 30/30 (2020.01)

(52) U.S. Cl.
CPC ............ G06F 30/367 (2020.01); G06F 30/18 (2020.01); G06F 30/20 (2020.01); G06F 30/30 (2020.01)

(58) Field of Classification Search
CPC ........ G06F 30/367; G06F 30/18; G06F 30/20; G06F 17/50; G06F 30/30
See application file for complete search history.

(56) References Cited

U.S. PATENT DOCUMENTS

| | | | |
|---|---|---|---|
| 9,619,604 B1 | 4/2017 | Rai et al. | |
| 2004/0044510 A1* | 3/2004 | Zolotov | G06F 30/33 703/14 |
| 2008/0010048 A1* | 1/2008 | Cheng | G06F 30/367 703/14 |
| 2010/0049455 A1* | 2/2010 | Scholtz | H02P 23/14 702/60 |

OTHER PUBLICATIONS

Hao Zhuang et al., Simulation Algorithms With Exponential Integration for Time-Domain Analysis of Large-Scale Power Delivery Networks, IEEE Transactions on Computer-Aided Design of Integrated Circuits and Systems, vol. 35, No. 10, Oct. 2016, pp. 1681-1694 (Year: 2016).*

(Continued)

Primary Examiner — Omar F Fernandez Rivas
Assistant Examiner — Michael Edward Cocchi
(74) Attorney, Agent, or Firm — Foley & Lardner LLP

(57) ABSTRACT

Embodiments are generally directed to a hierarchical approach for performing simulation for PDNs that have integrated VRMs. According to certain aspects, embodiments include an approach that decouples the simulation for PDN and the simulation for VRM/PKG through PDN macromodeling. In these and other embodiments, the approach includes a SPICE-accurate simulation for the VRM part using a non-linear solver and using a linear solver for the PDN part, with minimal handshaking between them. For example, using a Backward Euler method having a fixed time step, at every simulation time interval, the linear solver sends reduced boundary currents to the non-linear solver. After the non-linear solver converges at the time interval, it (Continued)

sends boundary voltages back to the linear solver for determining voltages in the PDN part at the time interval.

18 Claims, 6 Drawing Sheets

(56) References Cited

OTHER PUBLICATIONS

Zhiyu Zeng et al., Tradeoff Analysis and Optimization of Power Delivery Networks with On-Chip Voltage Regulation, 2010 ACM, pp. 831-836 (Year: 2010).*

Tom J Kazmierski and Hessa J Aljunaid. Synchronization of Analogue and Digital Solvers in MixedSignal Simulation on a SystemC Platform. In Forum on Specification and Design Languages, 2003. (Year: 2003).*

Wang, X., Kazmierski, T. J. and Mrcarica, Z. (1994) A lock-step synchronization algorithm for logic simulation in a multi-solver environment. Proc. ASIC'94 Conf., Bejing. (Year: 1994).*

* cited by examiner

FAST AND ACCURATE SIMULATION FOR POWER DELIVERY NETWORKS WITH INTEGRATED VOLTAGE REGULATORS

TECHNICAL FIELD

The present embodiments relate generally to simulation of electronic circuits and more particularly to techniques for performing simulation for integrated circuit power delivery networks having integrated voltage regulators.

BACKGROUND

A voltage regulator module (VRM) is an electronic component that converts a power supply voltage to a lower voltage required by one or more logic components in an integrated circuit such as an application specific integrated circuit (ASIC) or a system on a chip (SOC). A recent industry trend is to have voltage regulators more integrated with Power Delivery Networks (PDNs) so as to provide better fine-grain power management. For example, many SOC, ASIC or other IC designers use Low-Dropout (LDO) regulators to drive some blocks in the design due to their small area overhead, low standby current, low dropout voltage, improved power efficiency and superior transient response to fast load current variation.

DC-DC converters are considered to be power efficient even when the input-to-output voltage difference is large. Therefore they are widely used for Dynamic Voltage Scaling (DVS). As an example of this trend, Intel's Haswell and Broadwell and AMD's Zen all use on-chip voltage regulators.

Although popular, this trend presents a simulation challenge during the design process. Existing PDN solvers are purely linear and cannot handle non-linear devices such as voltage regulators. Meanwhile, general SPICE circuit simulators cannot handle the capacity of PDNs (up to billions of nodes).

Accordingly, a way to overcome this challenge remains desirable.

SUMMARY

Embodiments are generally directed to a hierarchical approach for performing simulation for PDNs that have integrated VRMs. According to certain aspects, embodiments include an approach that decouples the simulation for PDN and the simulation for VRM/PKG through PDN macromodeling. In these and other embodiments, the approach includes a SPICE-accurate simulation for the VRM part using a non-linear solver and using a linear solver for the PDN part, with minimal handshaking between them. For example, using a Backward Euler method having a fixed time step, at every simulation time interval, the linear solver sends reduced boundary currents to the non-linear solver. After the non-linear solver converges at the time interval, it sends boundary voltages back to the linear solver for determining voltages in the PDN part at the time interval.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

In general, the present embodiments are directed to a hierarchical approach for performing simulation for PDNs that have integrated VRMs. Embodiments include an approach that decouples the simulation for PDN and the simulation for VRM/PKG through PDN macromodeling. In these and other embodiments, the approach includes a SPICE-accurate simulation for the VRM part using a non-linear solver and using a linear solver for the remaining PDN part, with minimal handshaking between them.

As set forth above, the present applicants recognize an industrial trend of having VRMs tightly integrated with PDNs so as to provide fine-grain power management. The present applicants further recognize that, in view of this trend, how to provide the SPICE-level accurate analysis for PDNs with integrated VRMs becomes critical. The challenges to performing this analysis are twofold. On one hand, existing PDN analysis engines are purely linear and cannot handle non-linear devices. On the other hand, existing general SPICE circuit simulators cannot handle the capacity of PDNs (up to billions of nodes).

Figure 1A:
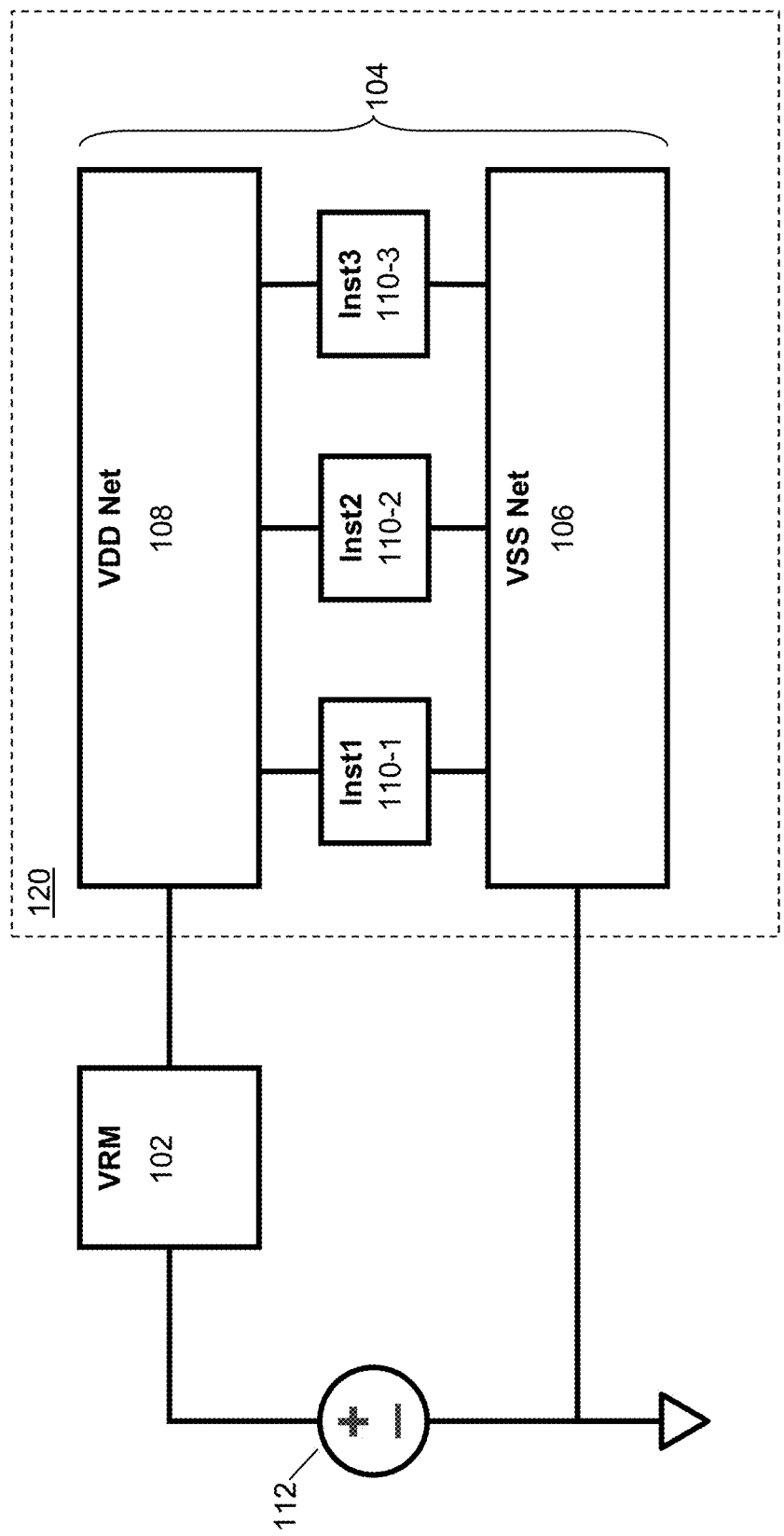
FIGS. 1A to 1C are block diagrams illustrating aspects of power delivery networks and integrated voltage regulators according to the present embodiments.
Figure 1B:
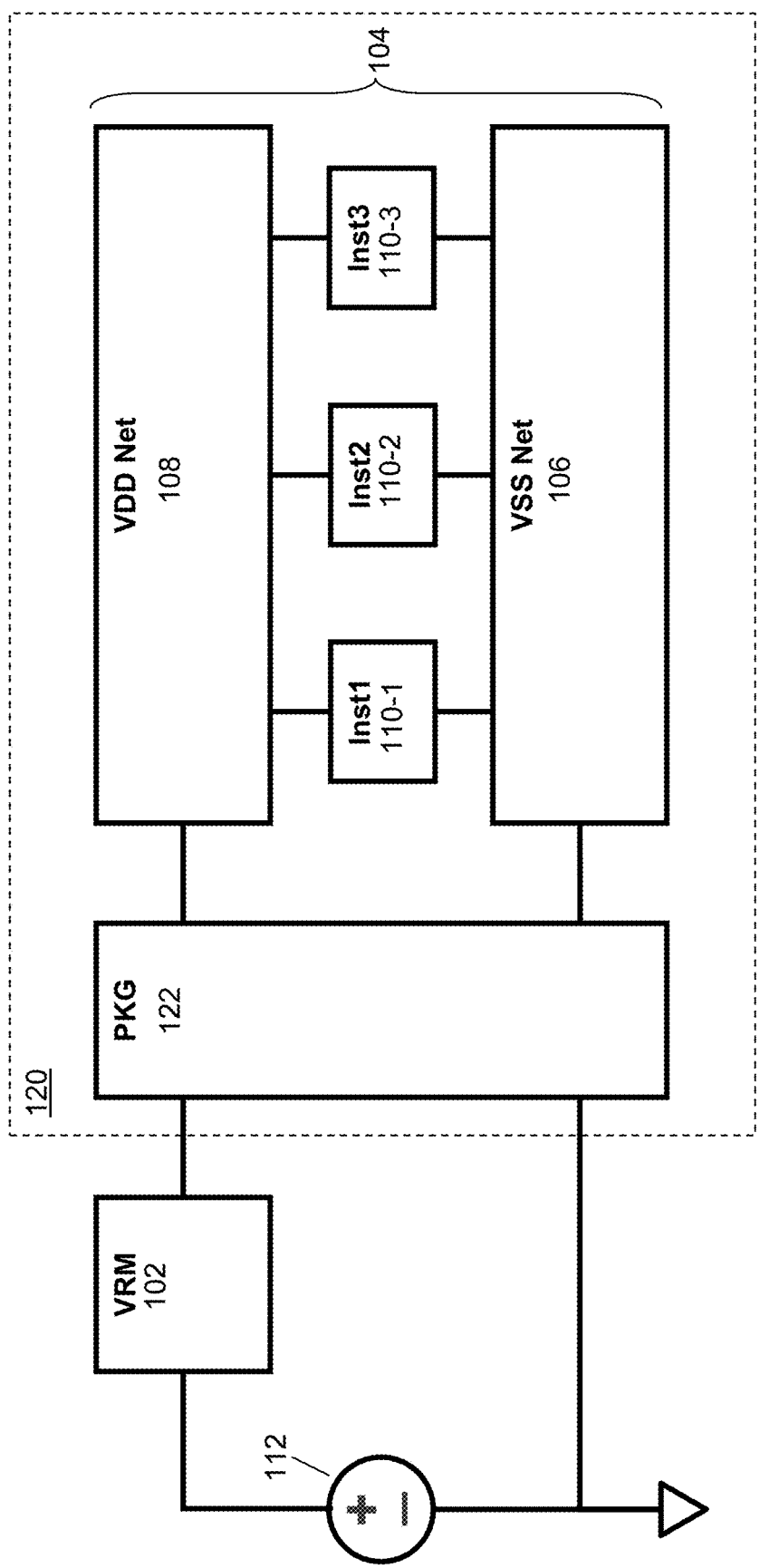
Figure 1C:
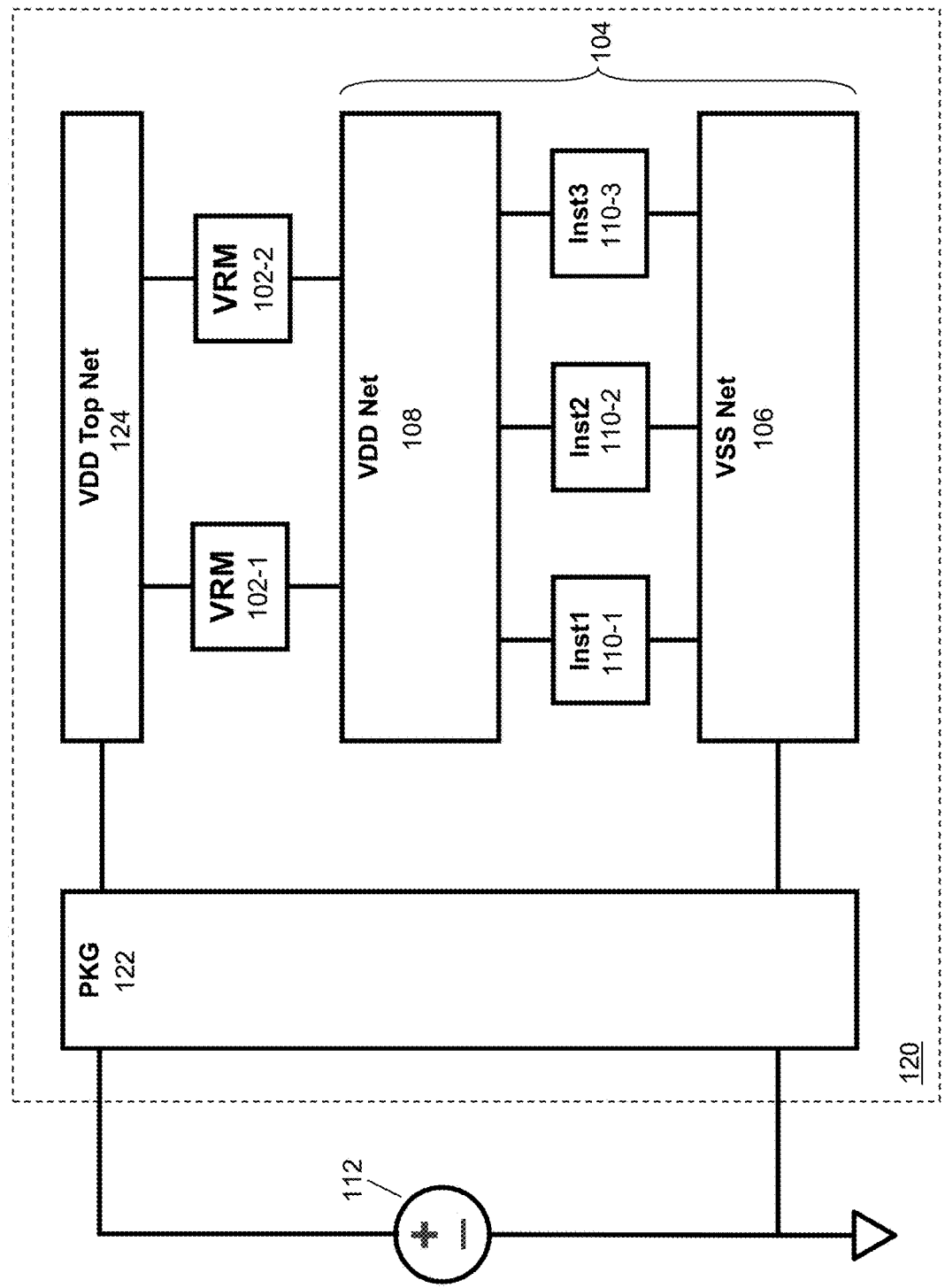

FIGS. 1A to 1C illustrate aspects of the VRM integration trend recognized by the present applicants. For example, FIG. 1A is a block diagram of an example system with VRMs driving a PDN in an integrated circuit directly.

More particularly, as shown in this example, VRM 102 converts a power supply voltage from source 112 and provides the regulated voltage directly to PDN 104, which includes a VDD net 108 and a VSS net 106. PDN 104 provides the regulated voltage and reference voltage (e.g., ground voltage via VSS net 106) to logic components, illustrated as instances 110-1 to 110-3.

As further shown in this example, PDN 104 and instances 110-1 to 110-3 are incorporated in an IC 120, such as an ASIC or a SOC. VRM 102 can be incorporated in a separate IC or component and can be connected to PDN 104 in IC 120 via pins, wires, printed circuit board (PCB) traces, and the like. It should be apparent that IC 120 can include many other components, including other PDNs, instances, processor cores, analog, mixed signal or other blocks, etc. However, such other blocks and components are not illustrated here for sake of clarity of the present embodiments. Moreover, although only three instances 110 are shown connected to PDN 104, there can be substantially more, up to millions of instances for a given PDN.

As should be appreciated by those skilled in the art, electronic or circuit IC components such as instances 110-1 to 110-3 have a power pin(s) and a ground pin that are connected to the power grid structure that implements VDD net 108 and VSS net 106. As should be further appreciated, power grid structure components include stripes, rails, vias, etc. As should be still further appreciated, although the illustrated PDN only shows VDD net 108 and VSS net 106, that a PDN can include multiple power nets, and can further include all of the power nets in a given design.

FIG. 1B is a block diagram of an example system with VRMs driving a PDN through package components.

As should be apparent, the example system of FIG. 1B is similar to the example system of FIG. 1A in that IC 120 further includes package components 122. Package components 122 can include passive components such as resistors, capacitors, inductors, and active components such as transistors, diodes, etc., as well as connecting structures such as stripes, rails, vias, etc.

FIG. 1C is a block diagram of an example system with on-chip VRMs driving a PDN in the same integrated circuit.

As shown, IC 120 in this example system incorporates package components 122 and VRMs 102-1 and 102-2 driving one or more PDNs 104. As further shown in this example, IC 120 further includes a VDD top power net 124 for providing power from off-chip power supply 112 to the VRMs 102-1, 102-2 via package components 122.

As still further shown in this example, VRMs receive power from the power supply via VDD top power net 124 rather than directly and/or through package components 122. VDD top power net 124 in these examples is an additional power grid structure that can be implemented by power grid components such as stripes, rails, vias, etc.

As set forth above, the present applicants recognize that, with this trend of integrating VRMs with PDNs as shown in the examples above, how to provide the SPICE-level accurate analysis for such PDNs with VRMs becomes critical. In this regard, the present applicants have further identified two main conventional methods to handle the simulation for PDNs with VRMs.

A first approach involves building linear models for the non-linear VRMs. This approach includes building a table-lookup or RLC model for VRMs under a certain loading/working condition. A problem with this method is low accuracy especially if the loading condition varies significantly. This is because VRMs are non-linear devices that are hard to be modeled as simple linear devices or lookup tables. The stimulus to PDN simulation is not deterministic and depends on the input vector. Therefore, it cannot be guaranteed that VRMs would only operate under some strict conditions as is necessary when they are modeled as linear devices or via lookup tables.

A second conventional approach involves using a waveform relaxation method that solve VRMs and PDNs independently. First, assuming the ideal voltage at the VRMs' outputs, PDNs are simulated and the loading currents at the VRMs' outputs are recorded. Then, these loading currents are fed to the VRM simulation to get updated output voltage waveforms. After this, the updated output waveforms are used to simulate the PDNs to get updated loading currents. The iteration continues until the maximum number of iterations is reached or the VRM output voltage change is within a threshold. A problem with this method is that it requires a long simulation runtime and a large amount of data that needs to be stored. Moreover, the waveform relaxation method does not provide a solution update between VRM and PDN at every time interval, which is especially problematic when there are abrupt changes in the PDN stimulus. Therefore, it suffers from a low convergence rate and a long simulation runtime.

Figure 2:
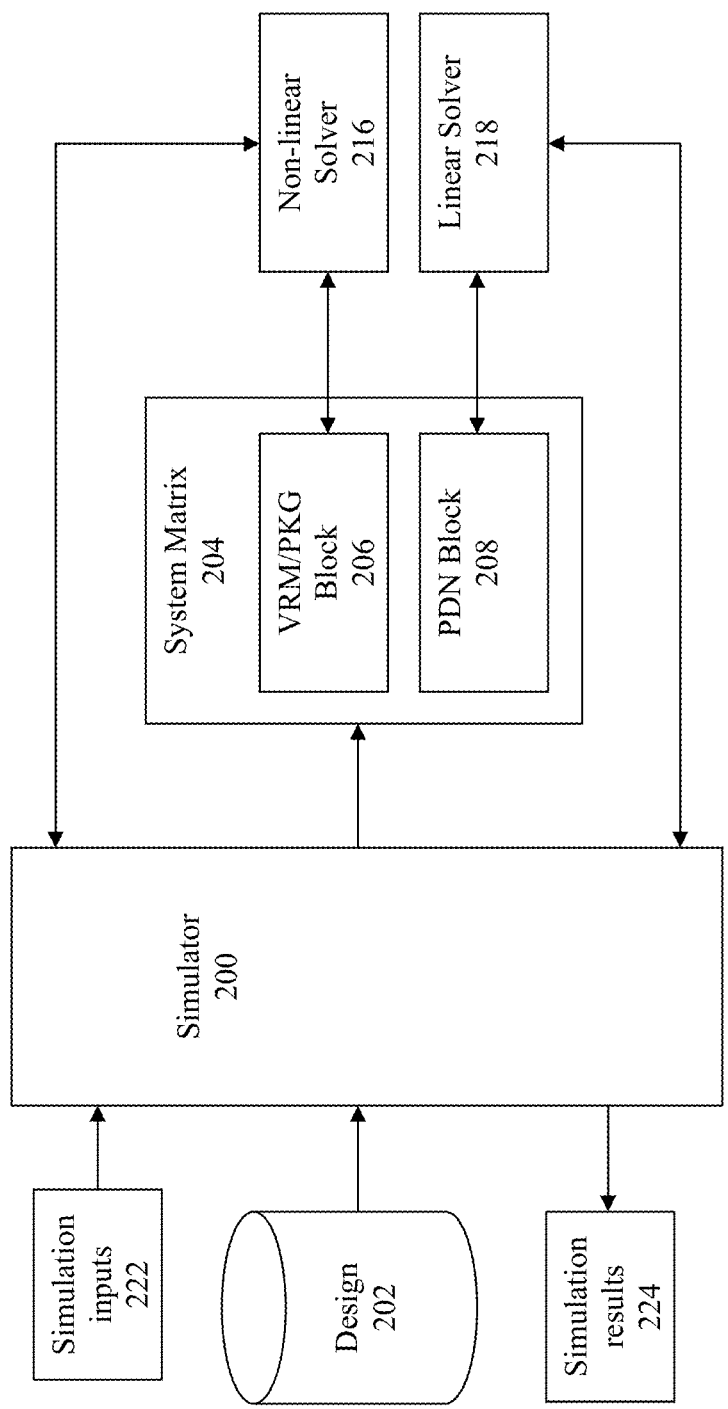
FIG. 2 is a block diagram illustrating an example system for performing simulation according to embodiments.

FIG. 2 is a block diagram illustrating an example system according to the present embodiments.

As shown in FIG. 2 this example system includes a simulator 200. In accordance with aspects of the present embodiments, simulator 200 implements a hierarchical approach that decouples the simulation for PDN and the simulation for VRM/PKG through PDN macromodeling.

More particularly, as shown in this example, simulator 200 operates on the design 202 to produce simulation results 224. Design 202 can comprise a full-chip description of an integrated circuit including all instances, their layout and connections, as well as the complete power grid for the integrated circuit, including all power nets, all VRMs (on and/or off chip), PKG blocks etc. For example, the description of the PDN in design 202 can include information about all power nets and instances in the form of DEF files, GDS files, technology files and cell library files. The description of the VRMs and PKG blocks in design 202 can include information in the form of SPICE netlist files.

As further shown in FIG. 2, based on the design, simulator 200 constructs a system matrix 204. In embodiments, this involves organizing the system matrix 204 into a block-based matrix using a Backward Euler method and a fixed time step h. In these and other examples shown in FIG. 2, system matrix 204 constructed by simulator 200 includes a VRM/PKG (or possibly just VRM, if there are no PKG components in the particular design) block 206 and a PDN block 208.

Figure 3:
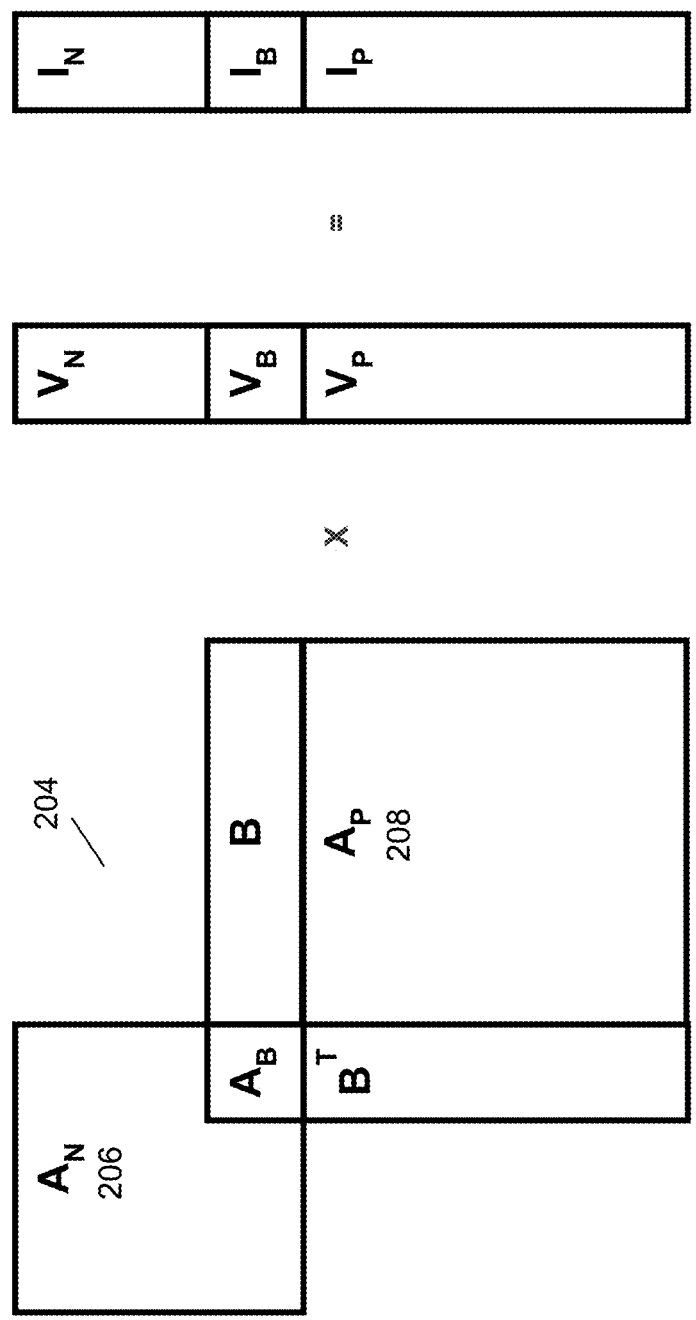
FIG. 3 is a diagram illustrating an example system matrix used by a simulator according to embodiments.

An example of system matrix 204 is shown in more detail in FIG. 3. In this example, $A_N$ is the linearized matrix for VRM/PKG block 206. $A_P$ is the matrix for PDN block 208. $A_B$ is the boundary matrix representing connections between PDN block 208 and VRM/PKG block 206. V and I are one-dimensional matrices or vectors representing the voltages and currents of all the nodes (e.g., power and ground input/output pins of all instances and components in all power nets, VRMs and PKG blocks of the design) in blocks 206 and 208, as well as nodes in the boundary connections represented by $A_B$, B and $B^T$.

In embodiments, the matrix $A_P$ for PDN block 208 is formed as the combination $(G_P+C_P/h)$ when using a Backward Euler method and a fixed time step h. In this example, $G_P$ is the transconductance at each node of the PDN block 208 and $C_P$ is the capacitance at each node of the PDN block 208. The values for $G_P$ and $C_P$ can be obtained from information in design 202. For example, in some embodiments, the RC network of the power grids or top level PDN of block 208 are extracted from their descriptions in DEF files, GDS files and technology files in design 202. Then the resistance and capacitance internal to the instances in the design are stitched into this RC network using information in cell library files in design 202. From this extracted overall RC network, the values of $G_P$ and $C_P$ can be readily derived. Because PDN block 208 is linear, $A_P$ is a time-invariant matrix, in that it is fixed for the duration of the simulation. It should be appreciated that the size of $A_P$ can be quite large, with row and column dimensions perhaps numbering in the millions or billions, depending on the number of nodes in the design.

$I_P$ is the tap current in the PDN and will be updated at every time step, and is also therefore known.

As should be appreciated by those skilled in the art, in general, the system matrix 204 can be used to perform a mathematical solution of any of the values of A, B, V or I given the known values of $A_P$ and $I_P$ and for certain other combinations of known values of A, B, V or I.

More particularly, and as will be described in more detail below, in accordance with the present embodiments, the values for VRM/PKG block 206 are solved using the mathematical formulation of the elements shown in FIG. 3 as:

$$(A_B - BA_P^{-1}B^T)V_B = I_B - BA_P^{-1}I_P$$

In this example, $A_B - BA_P^{-1}B^T$ is the macromodel for the PDN block 208. To solve for the $V_N$ values of VRM/PKG block 206, the values for $BA_P^{-1}B^T$ will be provided to the non-linear solver 216 by the linear solver 218. $V_B$ is also solved as a part of $V_N$ by the non-linear solver 216.

Likewise, in this example, the values of the voltages $V_P$ corresponding to the PDN block 208 are solved by linear solver 218 using the mathematical formulation of the elements shown in FIG. 3 as:

$$V_P = A_P^{-1}(I_P - B^T V_B)$$

In this example, $V_B$ is the boundary voltage solution for the PDN block 208, and will be provided to the linear solver 218 by non-linear solver 216 so as to solve for $V_P$ according to the equation set forth above.

Returning to FIG. 2, in addition to design 202, simulator 200 receives simulation inputs 222. These can include device models (e.g. models from a library such as a Process Design Kit (PDK)), test vectors such as vcd files or dynamic power files, and test parameters such as the time step size h and the length of the simulation T.

As set forth above, and was will be explained in more detail below, using matrix 204 and inputs 222, at each time step h, simulator 200 causes a SPICE-accurate solve for VRM/PKG block 206 to be performed using non-linear solver 216. Simulator 200 also causes a scalable and fast solve for PDN block 208 to be performed using linear solver 218. As will be further explained below, simulator 200 facilitates handshakes of solutions between non-linear solver 216 and linear solver 218 at every time interval.

At the conclusion, simulator 200 provides simulation results 224 which can comprise a set of values for all of the voltages V and currents I in the nodes comprising blocks 206 and 208 for all time steps. The simulation results 220 can also include the effective instance voltages for all time steps.

It should be noted that non-linear solver 216 and linear solver 218 can be implemented in various ways, and can also depend on the particular implementation of the overall system including simulator 200.

For example, the overall system including simulator 200 and solvers 216, 218 can be implemented by one or more general purpose computers that are loaded with an operating system executing software and/or customized to include hardware for interactively implementing simulation of PDNs having integrated VRMs using the functionality of the present disclosure. In some embodiments, the one or more computing systems comprise and/or communicate with various components not shown such as the processor(s) or processor core(s), memory, disks, etc. The one or more computing systems may further write to and read from a local or remote volatile or non-volatile computer accessible storage not shown that stores thereon data or information such as, but not limited to, design 202, inputs 222 and results 224, and can include one or more databases such as physical design database(s), libraries, data, rule decks, constraints, etc. and/or other information or data that may be required to support the methodology of the present embodiments. In some embodiments, the one or more computing systems are implemented in a "cloud" configuration and/or a client/server configuration. For example, one or more server computers may be loaded with application software for implementing some or all of the methodology of the present embodiments, and one or more client computers can communicate with the server computer(s) via a network to perform some or all of the methodology of the embodiments for a particular design. Such computing systems can further include one or more computing systems loaded with user interface functionality for providing designers with controls for initiating the performance of simulations for a particular design, providing any user-required inputs 222 and to view the results 224.

In these and other embodiments, simulator 200 and solvers 216 and 218 can be implemented using one or more existing electronic design automation (EDA) tools such as power integrity analysis tools, power verification tools, analog and mixed signal design simulation tools, tools to specifically analyze IR drop on PDNs and tools to analyze general non-linear circuits as adapted for use in the present embodiments. Those skilled in the art will understand how to adapt such existing tools after being taught by the present disclosure.

Additionally or alternatively, some or all of simulator 200 and solvers 216, 218 can be implemented using standalone or other types of software, and can possibly be adapted to communicate with components such as existing EDA tools. For example, one or both of solvers 216, 218 can be implemented by commercially available standalone tools having SPICE functionality for simulating non-linear circuit devices. The solver 218 can be implemented by standalone tools that specifically analyze PDNs.

In some or all of the above implementations, the present embodiments offer a parallel and scalable solution for PDNs with billions of nodes. For example, one or both of the simulations for PDN block 208 and VRM/PKG block 206 can be performed efficiently on multi-machine multi-CPU or multicore platforms. This can be done, for example, by partitioning the matrices of blocks 206, 208 and providing the partitions to different cores and/or machines to be solved in parallel.

Figure 4:
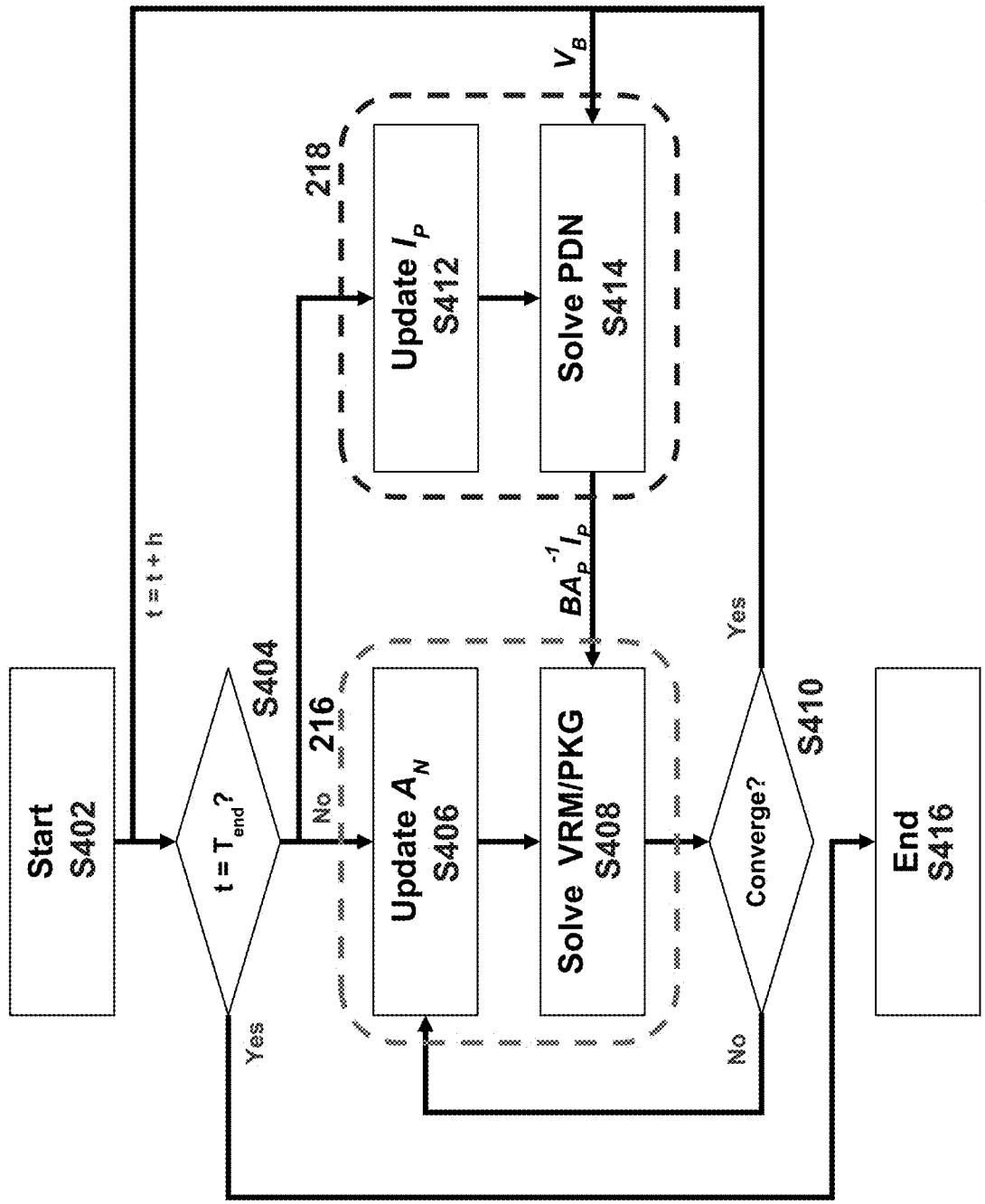
FIG. 4 is a flow chart illustrating an example methodology for performing simulation of power delivery networks having integrated voltage regulators according to embodiments.

An example methodology according to the present embodiments is shown in FIG. 4. According to certain general aspects, in the example methodology, a SPICE-solve for VRMs is performed without any accuracy loss. This solves the problem afflicting the VRM modeling method described above. The methodology also provides a solution update at every time interval so as to address the convergence issue of waveform relaxation method.

As shown, the process starts in step S402. This step S402 can include forming the system matrix 204 as described in more detail above, including the known values for $A_P$ and generating the macromodel for PDN block 208. This step S402 can also include initializing values for certain other variables such as $I_P$, which can be determined in accordance with simulation inputs 222 (e.g. power data file) as described above.

As can be seen, the example simulation process of FIG. 4 iterates for a number of fixed time intervals spanning from t=0 to t=$T_{end}$, as incremented by a fixed step size h in step S404. The value of $T_{end}$ is determined or based on simulation inputs 222 such as a user input or the length of simulation stored in power input file. The time interval h can also be provided in simulation inputs 222 and/or can be based on the minimum interval needed based on the operating frequency (e.g., at least twice ten times of the operating frequency) of the components in the circuits to be simulated. This is typically based on the operating frequency of the PDN block 208 because the response frequency of the VRM part is usually less than 100 MHz while the stimulus to the PDN part typically operates in the GHz range.

At every time interval set in step S404, as shown in the example of FIG. 4, linear solver 218 updates the current $I_P$ in step S412. The current $I_P$ at every node in the PDN is updated, for example based on user provided power data file in which the current for each instance at every time step is stored, as well as on the instance voltage/effective instance voltage from previous time step. Next in step S406, linear solver 218 performs a "forward" solve to solve for the reduced boundary currents which are represented by the combination of matrix elements $BA_P^{-1}I_P$. These reduced boundary currents will be provided to non-linear solver 216 by simulator 200. Linear solver 218 also in step S406 performs a "backward" solve to solve for the voltages of $V_P$ for this time step, which voltages are also saved for this time step.

For the same time interval set in step S404, non-linear solver 216 first in step S406 updates the values of $A_N$ based on the values of $A_N$ in the previous time step. For example, parameters in the linear models for the non-linear elements (e.g. transistors) in block 206 are updated for this Newton iteration using the prior values of the parameters and the time interval. Next, as shown in step S408, non-linear solver 216 then uses the reduced boundary currents obtained from linear solver 218 and the updated values of $A_N$ to solve for the values of $V_N$ in VRM/PKG block 206, using a Newton Raphson iteration method for example. In these and other embodiments, multiple iterations may be needed for convergence, as represented by step S410.

After the non-linear solver 216 converges at this time interval as determined in step S410, non-linear solver 216 provides the boundary voltages $V_B$ to linear solver 218 for use in solving for the PDN in the next interval as shown by S414. $V_B$ is solved as a part of $V_N$ by the non-linear solver 216, for example using the matrix equations set forth above. Also, after non-linear solver 216 converges at this time interval, processing returns S404 for the next time interval.

When all time intervals have been performed as determined in step S404, processing ends in step S416. As set forth above, this step can include providing simulation results 220, For example comprising a set of values for all of the voltages V and currents I in the nodes comprising blocks 206 and 208 for all time steps, as well as the effective instance voltages for all time steps.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method of simulating the behavior of a power delivery network (PDN) for an integrated circuit, the PDN including a non-linear portion, a linear portion and boundary connections between the non-linear portion and the linear portion, the method comprising:

using a linear solver to solve for voltages at nodes in the linear portion of the PDN at a time interval, the time interval comprising a single step in a plurality of different fixed time steps, each of the fixed time steps being a separate one of consecutive time steps from a beginning point in time to an end point in time;

using a non-linear solver to solve for voltages at nodes in the non-linear portion of the PDN at the time interval; and providing handshaking of information between the linear solver and the non-linear solver at the time interval, the information comprising outputs from both the linear solver and the non-linear solver for the time interval regarding one or both of voltages and currents in the boundary connections between the linear portion and the non-linear portion of the PDN, such that information is provided both from the linear solver to the non-linear solver and from the non-linear solver to the linear solver at the same time interval, wherein providing handshaking includes:

obtaining reduced boundary currents from the linear solver at the time interval and providing the reduced boundary currents to the non-linear solver; and obtaining boundary voltages from the non-linear solver after the non-linear solver converges at the time interval and providing the boundary voltages to the linear solver for completing a solution for the linear part at the time interval.

2. The method of claim 1, wherein the non-linear portion comprises a voltage regulator module (VRM) that is integrated in the PDN, and wherein the time interval is based on an operating frequency of the PDN.

3. The method of claim 1, wherein the time interval is a fixed time step in a Backward Euler method.

4. The method of claim 1, wherein the linear solver performs a forward solve at the time interval to determine the reduced boundary currents.

5. The method of claim 1, wherein the linear solver performs a backward solve at the time interval to determine the completed solution for the linear portion.

6. The method of claim 1, wherein the non-linear solver uses an iterative method to solve for the voltages at the nodes in the non-linear portion at the time interval.

7. The method of claim 6, wherein the iterative method is a Newton Rapshon method.

8. A computer program product comprising a non-transitory computer readable storage medium having instructions recorded thereon which, when executed by a computer, cause the computer to perform a method of simulating the behavior of a power delivery network (PDN) for an integrated circuit, the PDN including a non-linear portion, a linear portion and boundary connections between the non-linear portion and the linear portion, the method comprising:

using a linear solver to solve for voltages at nodes in the linear portion of the PDN at a time interval, the time interval comprising a single step in a plurality of different fixed time steps, each of the fixed time steps being a separate one of consecutive time steps from a beginning point in time to an end point in time;

using a non-linear solver to solve for voltages at nodes in the non-linear portion of the PDN at the time interval; and providing handshaking of information between the linear solver and the non-linear solver at the time interval, the information comprising outputs from both the linear solver and the non-linear solver for the time interval regarding one or both of voltages and currents in the boundary connections between the linear portion and the non-linear portion of the PDN, such that information is provided both from the linear solver to the non-linear solver and from the non-linear solver to the linear solver at the same time interval, wherein providing handshaking includes:

obtaining reduced boundary currents from the linear solver at the time interval and providing the reduced boundary currents to the non-linear solver; and obtaining boundary voltages from the non-linear solver after the non-linear solver converges at the time interval and providing the boundary voltages to the linear solver for completing a solution for the linear part at the time interval.

9. The computer program product of claim 8, wherein the non-linear portion comprises a voltage regulator module (VRM) that is integrated in the PDN, and wherein the time interval is based on an operating frequency of the PDN.

10. The computer program product of claim 8, wherein the time interval is a fixed time step in a Backward Euler method.

11. The computer program product of claim 8, wherein the linear solver performs a forward solve at the time interval to determine the reduced boundary currents.

12. The computer program product of claim 8, wherein the linear solver performs a backward solve at the time interval to determine the completed solution for the linear portion.

13. The computer program product of claim 8, wherein the non-linear solver uses an iterative method to solve for the voltages at the nodes in the non-linear portion at the time interval.

14. The computer program product of claim 13, wherein the iterative method is a Newton Rapshon method.

15. A system for simulating the behavior of a power delivery network (PDN) for an integrated circuit, the PDN including a non-linear portion and a linear portion, the system comprising:

a linear solver to solve for voltages at nodes in the linear portion of the PDN at a time interval, the time interval comprising a single step in a plurality of different fixed time steps, each of the fixed time steps being a separate one of consecutive time steps from a beginning point in time to an end point in time;

a non-linear solver to solve for voltages at nodes in the non-linear portion of the PDN at the time interval; and a simulator that provides handshaking of information between the linear solver and the non-linear solver at the time interval, the information comprising outputs from both the linear solver and the non-linear solver for the time interval regarding one or both of voltages and currents in the boundary connections between the linear portion and the non-linear portion of the PDN, such that information is provided both from the linear solver to the non-linear solver and from the non-linear solver to the linear solver at the same time interval, wherein providing handshaking includes:

obtaining reduced boundary currents from the linear solver at the time interval and providing the reduced boundary currents to the non-linear solver; and obtaining boundary voltages from the non-linear solver after the non-linear solver converges at the time interval and providing the boundary voltages to the linear solver for completing a solution for the linear part at the time interval.

16. The system of claim 15, wherein the non-linear portion comprises a voltage regulator module (VRM) that is integrated in the PDN, and wherein the time interval is based on an operating frequency of the PDN.

17. The system of claim 15, wherein the non-linear solver implements an iterative method to solve for the voltages at the nodes in the non-linear portion at the time interval.

18. The system of claim 17, wherein the iterative method is a Newton Rapshon method.

* * * * *